United States Patent
Kim et al.

(10) Patent No.: US 10,021,375 B2
(45) Date of Patent: Jul. 10, 2018

(54) DISPLAY DEVICE AND METHOD OF DRIVING THE SAME

(71) Applicant: LG DISPLAY CO., LTD., Seoul (KR)

(72) Inventors: Ho-Jae Kim, Gyeongsan-si (KR); Sang-Hun Park, Gumi-si (KR); Kyung-Ki Kim, Gongju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 431 days.

(21) Appl. No.: 14/581,572

(22) Filed: Dec. 23, 2014

(65) Prior Publication Data
US 2015/0181203 A1    Jun. 25, 2015

(30) Foreign Application Priority Data

Dec. 24, 2013   (KR) .................. 10-2013-0162331

(51) Int. Cl.
*H04N 13/04*   (2006.01)
*G02B 27/22*   (2018.01)

(52) U.S. Cl.
CPC ..... *H04N 13/0409* (2013.01); *G02B 27/2214* (2013.01); *H04N 13/0415* (2013.01); *H04N 13/0447* (2013.01); *H04N 13/0452* (2013.01)

(58) Field of Classification Search
CPC ........... G02B 27/2214; H04N 13/0409; H04N 13/0452; H04N 13/0447; H04N 13/0415
USPC ............. 348/59; 1/1; 345/77, 204, 690
See application file for complete search history.

(56) References Cited

U.S. PATENT DOCUMENTS

| | | | | |
|---|---|---|---|---|
| 5,825,343 | A * | 10/1998 | Moon ............... | G09G 3/3677 345/204 |
| 9,185,397 | B2 * | 11/2015 | Kim ................. | H04N 13/0409 |
| 2007/0279341 | A1* | 12/2007 | Park ................. | G09G 3/2011 345/77 |
| 2008/0117233 | A1* | 5/2008 | Mather ............. | G09G 3/003 345/690 |
| 2011/0310131 | A1* | 12/2011 | Fergason .......... | G09G 3/3406 345/690 |
| 2014/0098418 | A1* | 4/2014 | Lin ................... | G02B 27/2214 359/463 |

FOREIGN PATENT DOCUMENTS

| | | | |
|---|---|---|---|
| CN | 102843567 A | 12/2012 | |
| CN | 103051917 A | 4/2013 | |
| EP | 0822441 A2 * | 2/1998 | ......... G02B 27/2214 |

* cited by examiner

*Primary Examiner* — Mohammed Rahaman
*Assistant Examiner* — Richard Carter
(74) *Attorney, Agent, or Firm* — Dentons US LLP

(57) ABSTRACT

A display device producing multi-views comprising: a display panel including a plurality of pixels in a matrix, wherein pixels corresponding to the multi-views, respectively, constitute a pixel group in a slanted direction with respect to a vertical direction, and wherein the multi-views are three or more views; a multi-view point producing panel including a barrier region or a lenticular lens array in the slanted direction having a pitch corresponding to the pixel group; and a driving circuit configured to reduce a grey level of an image data signal of at least one pixel of the plurality of pixels, which is at a side boundary of the pixel group causing a three-dimensional (3D) crosstalk (C/T), and output an image data signal having a reduced grey level to the display panel.

18 Claims, 10 Drawing Sheets

<left-eye image>  grey level reduction

DISPLAY DEVICE AND METHOD OF DRIVING THE SAME

This application claims the benefit of Korean Patent Application No. 10-2013-0162331, filed in Korea on Dec. 24, 2013, which is incorporated by reference in its entirety for all purposes as if fully set forth herein.

BACKGROUND

Field of the Disclosure

Embodiments of the invention relate to a display device, and more particularly, relate to a display device and a method of driving the same that can reduce 3D (three-dimensional) crosstalk while displaying a 3D image when the device uses a parallax barrier or lenticular lens having a slanted structure.

Discussion of the Related Art

Imaging technology creating a 3D effect from 2D (two-dimensional) images influences not only display devices but also other fields such as home appliances, telecommunications, aerospace, automotive, and fine arts. The effect of the 3D technology in the market is expected to be greater than that of HDTV.

Of the factors with which a human being perceives a 3D effect, a binocular parallax is most important, but mental and memory factors are closely associated. Accordingly, 3D imaging technology is categorized into a depth image type, a 3D image type, and a stereographic image type with respect to what extent 3D image information is supplied to a viewer.

Among these types, the depth image type is a method of providing depth perspective using a mental factor and a draw-in effect, and is applied to a 3D computer graphic that displays perspective, overlap, shadow, light and shade, movement, and the like by calculation. For example, an I-MAX movie which supplies a wide-view large-sized screen to a viewer can create an optical illusion of image depth with respect to the projection screen. The 3D image type known as the perfect one of the 3D imaging technologies is a holographic type such as a laser beam reproduction holograph or a white light reproduction holograph.

However, because the above depth image type or holographic 3D image type have limitations of high cost, high equipment expense, and high data requirements to increase spatial depth perception, the stereographic type using a physiological factor with both eyes is widely used.

The stereographic type display device displays a 3D image using binocular parallax. In this 3D imaging type, when the right and left eyes of a viewer that are spaced apart from each other at about 65 mm look at two respective 2D images, the two 2D images are processed by the brain mixing the two 2D images. Thus, a 3D image having depth is perceived. The stereographic type display device is categorized into a glasses-type in which a viewer wears glasses, and a non-glasses type that uses a lens array such as a parallax barrier, lenticular lens, or the like, so the user does not need glasses. Among these, the non-glasses type is preferable.

Particularly, among the non-glasses type display devices, a parallax barrier-type is preferable.

FIG. 1 is a schematic cross-sectional view illustrating a parallax barrier-type 3D display device according to the related art. FIG. 2 is a schematic plan view illustrating a barrier panel of a vertical structure according to the related art. And, FIG. 3 is a schematic plan view illustrating a barrier panel of a slanted structure according to the related art.

Referring to FIG. 1, the 3D display device 10 includes a display panel 20, and a barrier panel 30 on a front of the display panel 20.

The display panel 10 includes a plurality of pixels P in a matrix. Pixels R for right eye (i.e., right-eye pixels) and pixels L for left eye (i.e., left-eye pixels) are alternately arranged in a horizontal direction.

Referring to FIG. 2, the barrier panel 30a of the vertical structure includes alternating barrier regions B that block light and transmissive regions T that transmit light. The barrier regions B and the transmissive regions T extend in a stripe pattern in a vertical direction.

When the barrier regions B are patterned in the vertical direction, 2 views displaying one image for left eye (i.e., an left-eye image) and another image for right eye (i.e., a right-eye image), respectively, are alternately produced at the front of the barrier panel 30a. In this case, a 3D image can be perceived.

However, the vertical structure-type barrier panel 30a causes too much flicker.

Referring to FIG. 3, the slanted structure-type barrier panel 30b includes barrier regions B and transmissive regions T extending in a slanted direction with respect to the vertical direction.

In this case, a pixel group having 3 pixels or more of the display panel 20 is arranged repeatedly in a slanted direction corresponding to the barrier region B.

Because of the slanted barrier structure and pixel structure, 3 or more multi-views corresponding to a number of pixels of the pixel group and displaying a left-eye image and a right-eye image are produced that overlap one another in front of the barrier panel 30b. In this case, when a viewer's left and right eyes are positioned at the 2 views out of the multi-views, a 3D image can be perceived.

Perceived flicker of the display device using the slanted structure-type barrier panel 30b is reduced compared to that with a vertical structure barrier.

However, the slanted structure-type barrier panel 30b causes 3D crosstalk (C/T). In other words, the left-eye image and the right-eye image deviate from a limit acceptable area of a barrier pitch affecting the right eye and the left eye. This image deviation causes crosstalk.

It is commonly understood that the area of the transmissive region T can be increased to increase output luminance of the display device. However, referring to FIG. 4 and Table 1, when an open ratio of the transmissive region T (i.e., an open ratio) to the barrier region B (i.e., a light blocking region) becomes more than a predetermined ratio, the 3D C/T increases rapidly, and this is a limitation on increasing luminance.

TABLE 1

| Open ratio | 25% | 33.3% | 41.7% | 50% |
|---|---|---|---|---|
| 3D C/T | 4.13% | 4.36% | 5.88% | 11.49% |

Accordingly, reduction of the 3D C/T is required for the 3D display device using the slanted structure-type barrier panel 30b.

Also, a 3D display device using a slanted structure lenticular lens has the 3D C/T similar to the 3D display device using the slanted structure barrier panel. Therefore, reduction of the 3D C/T is also required for the 3D display device using the slanted structure lenticular lens.

SUMMARY

Accordingly, embodiments of the invention are directed to a display device and a method of driving the same that substantially obviates one or more of problems due to limitations and disadvantages of the related art.

An object of the invention is to provide a display device and a method of driving the same that can reduce 3D C/T.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, according to an aspect of the invention, there is provided a display device producing multi-views comprising: a display panel including a plurality of pixels in a matrix, wherein pixels corresponding to the multi-views, respectively, constitute a pixel group in a slanted direction with respect to a vertical direction, and wherein the multi-views are three or more views; a multi-view point producing panel including a barrier region or a lenticular lens array in the slanted direction having a pitch corresponding to the pixel group; and a driving circuit configured to reduce a grey level of an image data signal of at least one pixel of the plurality of pixels, which is at a side boundary of the pixel group causing a three-dimensional (3D) crosstalk (C/T), and output an image data signal having a reduced grey level to the display panel.

In another aspect of the invention, a method of driving a display device, wherein the device display device includes a display panel including a plurality of pixels in a matrix, wherein pixels corresponding to multi-views, respectively, constitute a pixel group in a slanted direction with respect to a vertical direction, and a multi-view point producing panel including a barrier region or a lenticular lens array in the slanted direction having a pitch corresponding to the pixel group, the multi-views being 3 or more views, the method comprising: reducing a grey level of an image data signal corresponding to at least one pixel of the plurality of pixels, which is at a side boundary of the pixel group causing a 3D C/T, by a driving circuit; and outputting an image data signal having a reduced grey level from the driving circuit to the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 1:
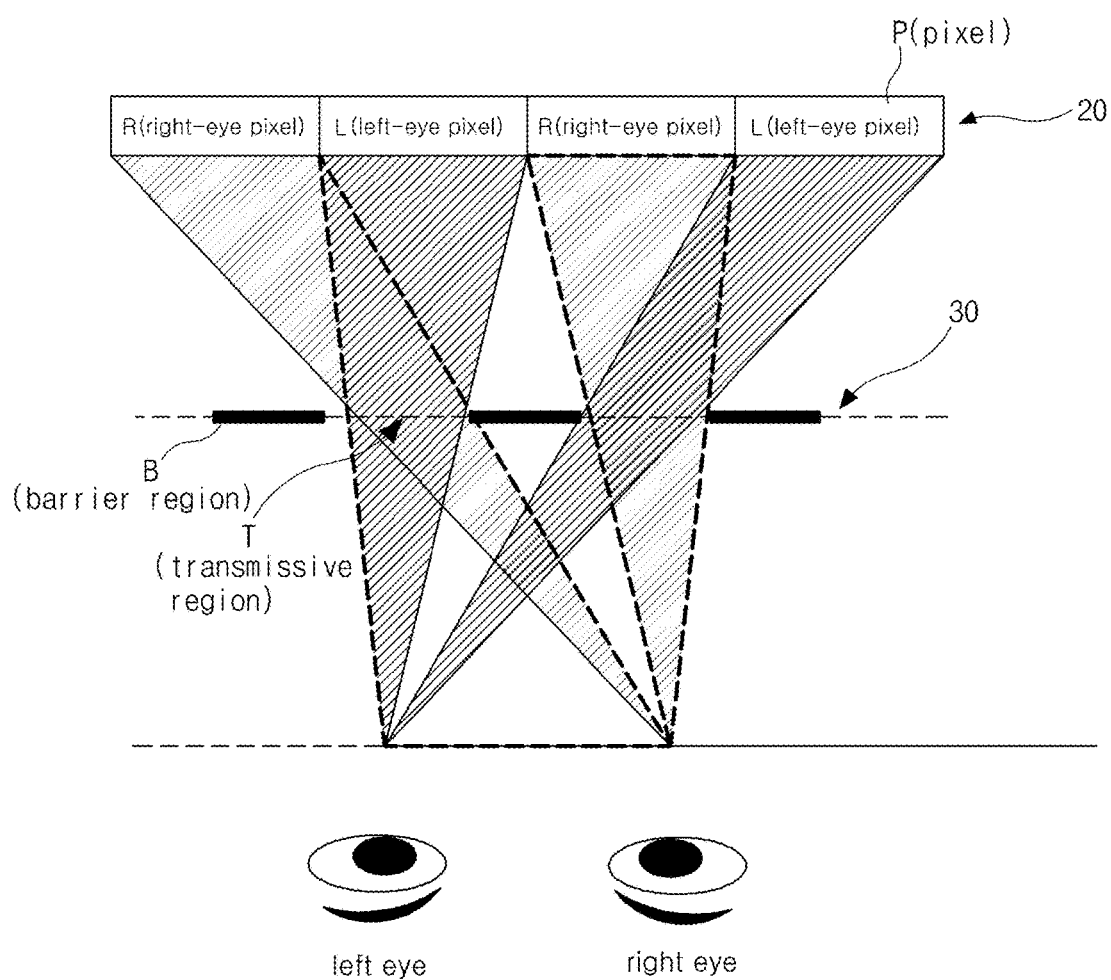
FIG. 1 is a schematic cross-sectional view illustrating a parallax barrier-type 3D display device according to the related art.
Figure 2:
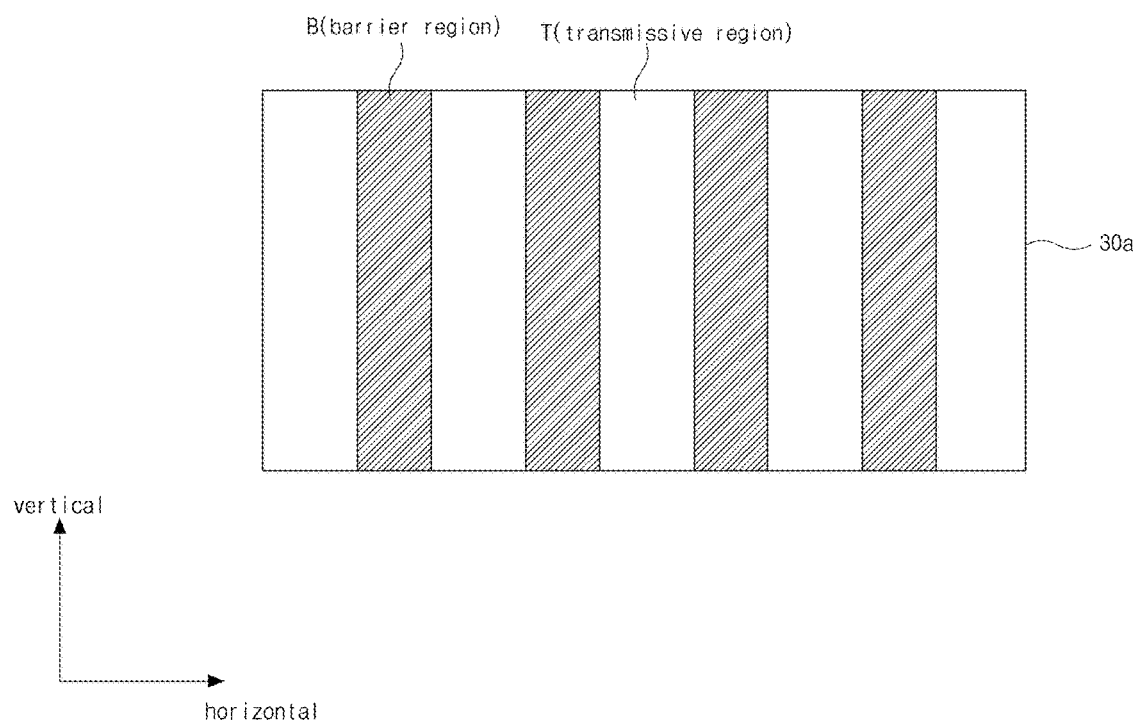
FIG. 2 is a schematic plan view illustrating a barrier panel of a vertical structure according to the related art.
Figure 3:
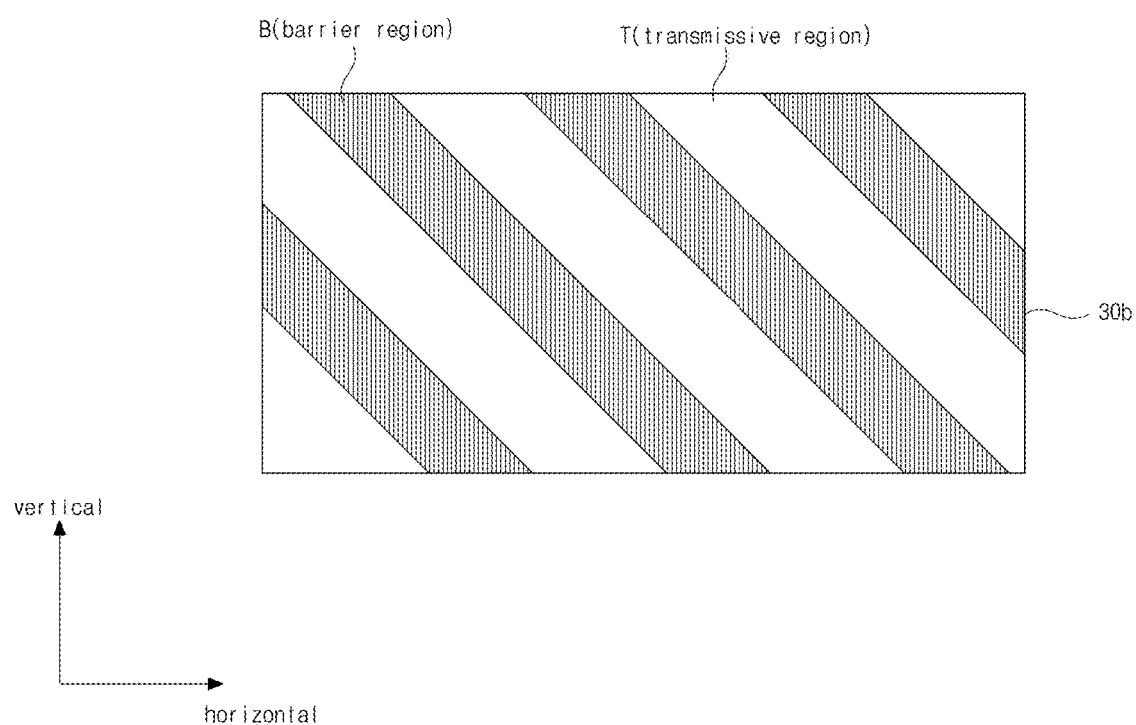
FIG. 3 is a schematic plan view illustrating a barrier panel of a slanted structure according to the related art.
Figure 4:
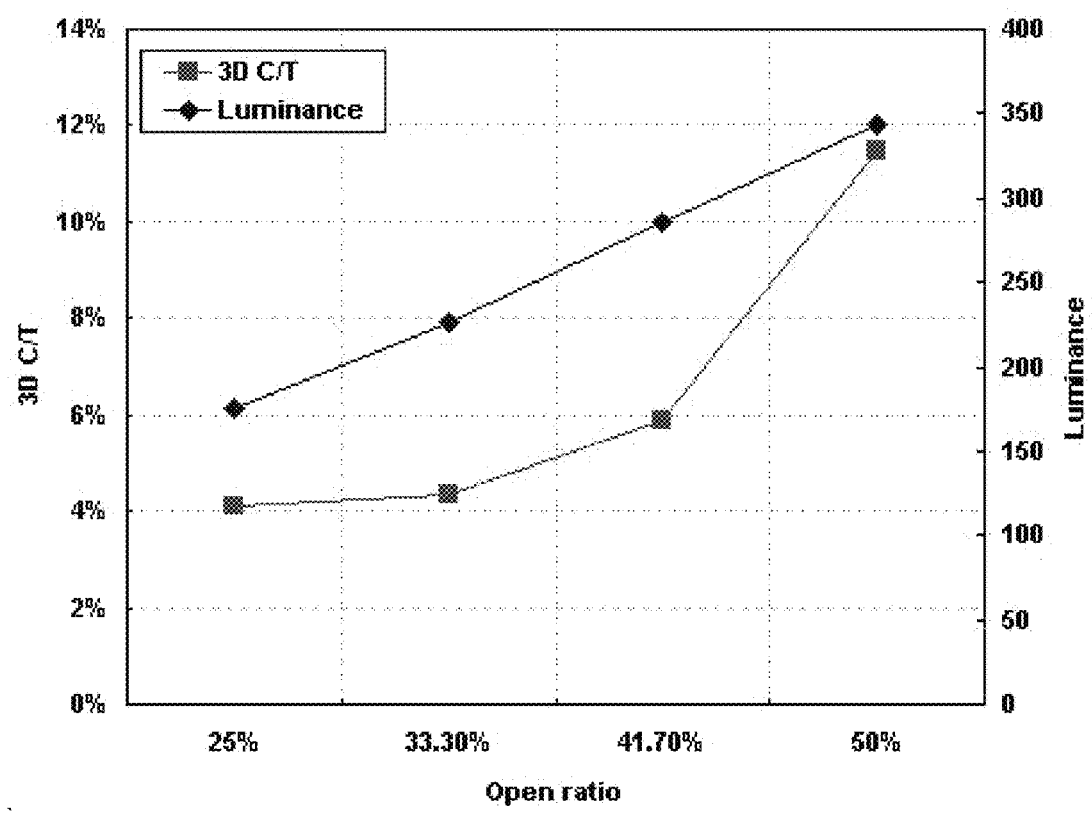
FIG. 4 is a graph illustrating a relationship of a 3D C/T and a luminance to an open ratio when using a barrier panel of a slanted structure according to the related art.
Figure 5:
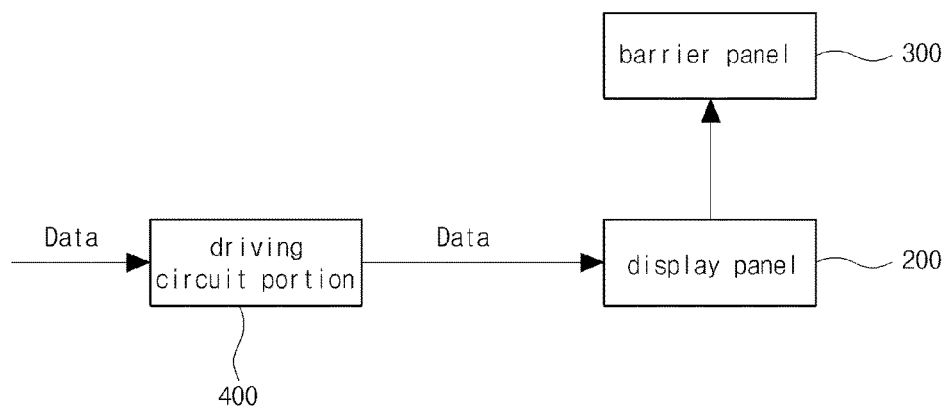
FIG. 5 is a schematic block diagram illustrating a display device according to a first exemplary embodiment of the present invention.
Figure 6:
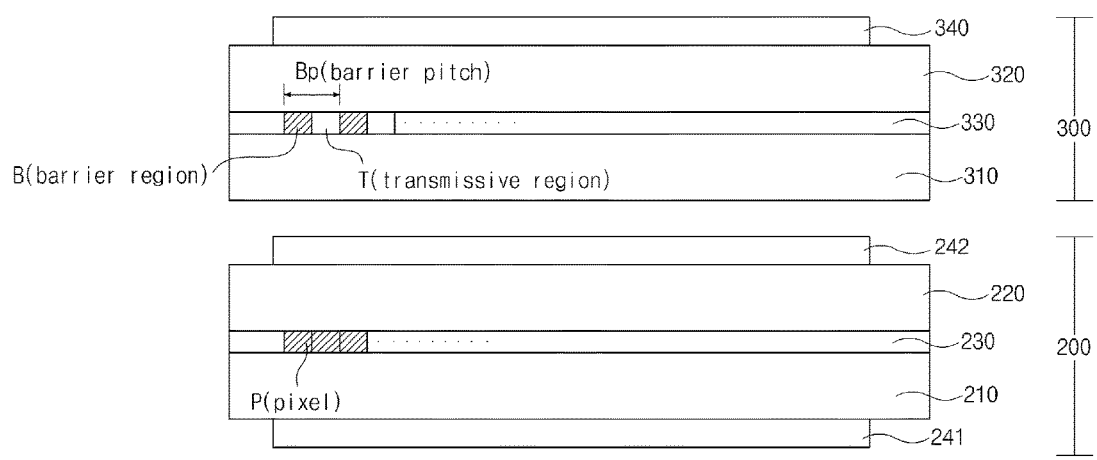
FIG. 6 is a schematic cross-sectional view illustrating a display device according to the first exemplary embodiment of the present invention.
Figure 7:
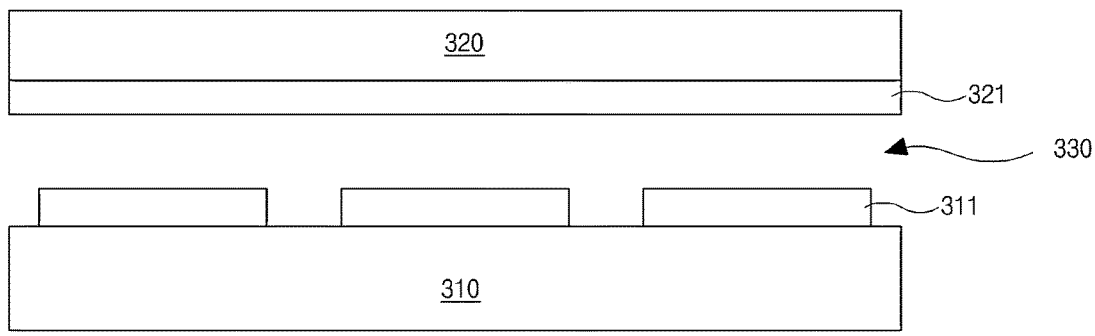
FIG. 7 is a schematic cross-sectional view illustrating a barrier panel according to the first exemplary embodiment of the present invention.
Figure 8:
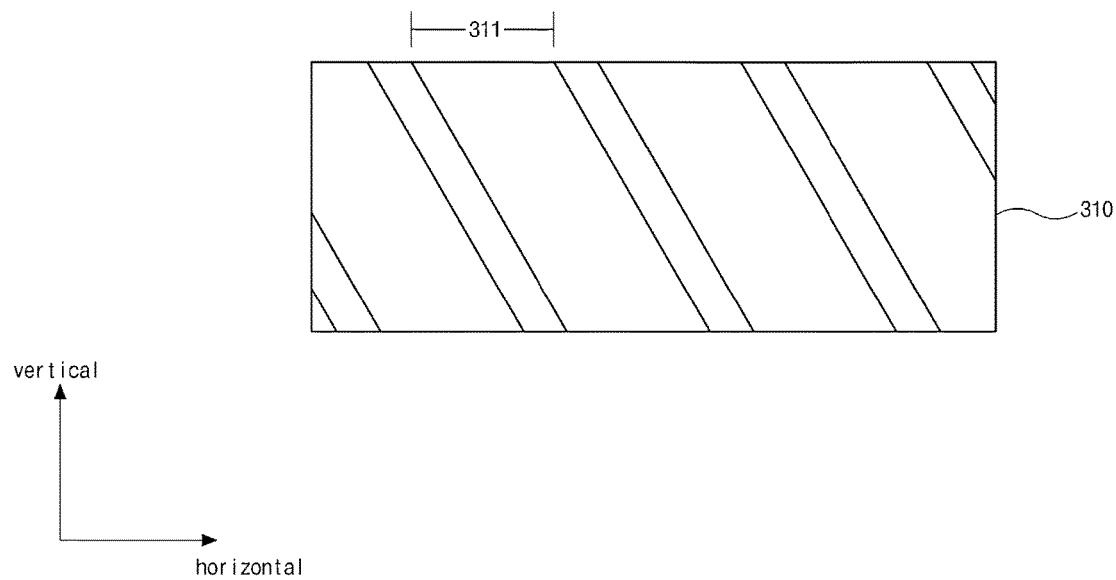
FIG. 8 is a schematic cross-sectional view illustrating a structure of electrodes of a barrier panel according to the first exemplary embodiment of the present invention.

FIG. 5 is a schematic block diagram illustrating a display device according to the first exemplary embodiment of the present invention. FIG. 6 is a schematic cross-sectional view illustrating a display device according to the first exemplary embodiment of the present invention. FIG. 7 is a schematic cross-sectional view illustrating a barrier panel according to the first exemplary embodiment of the present invention. FIG. 8 is a schematic cross-sectional view illustrating a structure of electrodes of a barrier panel according to the first exemplary embodiment of the present invention.

Referring to FIGS. 5 and 6, the display device 100 includes a display panel 200, a slanted structure-type barrier panel 300, and a driving circuit portion 400 to drive the display panel 200.

The display panel 200 may be, for example, a liquid crystal display panel, an organic light-emitting diode display panel, a plasma display panel, or the like. For the purpose of explanation, the display panel 200 is exemplified as a liquid crystal display panel.

In this case, the display panel 200 includes first and second substrates 210 and 220 and a liquid crystal layer 230 therebetween.

The first substrate 210 may be an array substrate, which may include a plurality of gate lines along a horizontal direction, and a plurality of data lines along a vertical direction. The gate lines and the data lines crossing each other define a plurality of pixel region P in a matrix.

A switching thin film transistor may be formed near the crossing portion of the gate and data lines and connected to the gate and data lines. The switching thin film transistor is connected to a pixel electrode in the pixel P.

A second substrate 220 opposing the first substrate 210 may include red, green, and blue color filters corresponding to the respective pixels R, G, B, (P) and a black matrix surrounding the color filters. The second substrate 220 having this configuration may be referred to as a color filter substrate. The second substrate may further include a common electrode covering the color filter and the black matrix.

Liquid crystal molecules of the liquid crystal layer 230 are oriented according to an electric field produced by the pixel electrode and the common electrode and are used to display an image.

Liquid crystal display panels having a configuration different from the above configuration may be used. For example, an IPS (in-plane switching) mode liquid crystal display panel or FFS (fringe field switching) mode may be used, in which a pixel electrode and a common electrode are formed in the first substrate 210.

First and second polarization plates 241 and 242 may be attached onto outer surfaces of the first and second substrates 210 and 220, respectively. The first and second polarization plates 241 and 242 may have transmission axes perpendicular to each other.

Although not shown in the drawings, a backlight unit is opposite the display panel 200 from the barrier panel 300.

The barrier panel 300 is at the front of the display panel 200. Although not shown in the drawings, a gap substrate may be between the barrier panel 300 and the display panel 200 to maintain a distance between the barrier panel 300 and the display panel 200. This distance is determined as a function of a viewing distance of the multi-views (3 or more views).

The barrier panel 300 includes barrier regions B and transmissive regions T extending along a slanted direction and alternately arranged.

As the barrier panel 300, a panel may be used in which the barrier regions B and the transmissive regions T are fixed by forming a barrier pattern as a light-blocking film at the barrier regions B and forming a transparent opening between the barrier patterns.

Alternatively, as the barrier panel 300, a panel may be used in which the barrier regions B and the transmissive regions T are varied by using a liquid crystal layer to adjust light transmission.

In the embodiment, for the purpose of explanation, the barrier panel 300 including the liquid crystal layer is described.

In this case, operation of the barrier panel 300 may be controlled by the driving circuit portion 400.

Referring to FIGS. 6 to 8, the barrier panel 300 may include first and second barrier substrates 310 and 320 facing each other, and a barrier liquid crystal layer 330 therebetween.

A plurality of first barrier electrodes 311 having a stripe shape and extending in a slanted direction may be formed on an inner surface of one of the first and second barrier substrates 310 and 320, for example, the first barrier substrate 310. The barrier electrode 311 may include a transparent conductive material, for example, ITO or IZO.

A second barrier electrode 321 facing the first barrier electrodes 311 may be formed on the second barrier substrate 320. The second barrier electrode 321 may include a transparent conductive material, for example, ITO or IZO. The second barrier electrode 321 may be formed in one monolithic layer on the substantially entire surface of the second barrier substrate 320 and may function as a common electrode.

Alternatively, the second barrier electrode 321 as a common electrode may be formed on the first barrier substrate 310, and the first barrier electrodes 311 may be formed on the second barrier substrate 320.

A third polarization plate 340 may be attached on the front surface of the barrier panel 300. The third polarization plate 340 may have a transmission axis perpendicular to a transmission axis of the second polarization plate 242.

The barrier region B and the transmissive region T can be used in operating the barrier panel 300 in a multi-view mode. When an electric field is applied to the barrier liquid crystal layer 330, light from the second polarization plate 242 may pass through the barrier liquid crystal layer 330 without changing the polarization direction and then enter the third polarization plate 340. In this case, a polarization axis of the light is perpendicular to the transmission axis of the third polarization plate 340 and light is not transmitted out to the front of the barrier panel 300.

When an electric field is not applied to the barrier liquid crystal layer 330, light from the second polarization plate 242 may pass through the barrier liquid crystal layer 330 with a polarization of the light rotated at 90 degrees angle and then enter the third polarization plate 340. In this case, a polarization of light is parallel with the transmission axis of the third polarization plate 340 and light is transmitted out to the front of the barrier panel 300.

Accordingly, when the multi-view mode is operating, a second driving voltage as a common voltage is applied to the second barrier electrode 321. A first driving voltage to produce an electric field is applied to the first barrier electrode 311 located at a region to form the barrier region B, and the second driving voltage is applied to the first barrier electrode 311 located at a region to form the transmissive region T.

During application of the driving voltages as above, the barrier regions B to block light and the transmissive regions T to transmit light can be produced.

By adjusting a number of the first barrier electrodes 311 neighboring to one another supplied with the first driving voltage and a number of the first barrier electrodes 311 neighboring to one another supplied with the second driving voltages, widths of the barrier regions B and the transmissive regions T can be adjusted.

The barrier panel 300 is not operated (i.e., in an off state) when the display device 100 is operated in a 2D display mode. In this case, the barrier electrodes 311 and 321 are not supplied with driving voltages, and thus, the barrier panel 300 is in a transmissive state, i.e., transmits light through the entire panel. Accordingly, light from the barrier panel 300 passes through the third polarization plate 340 and comes out to the front.

The driving circuit portion 400 receives image data signals Data and timing signals from an external system, processes the image data signals Data, and supplies the image data signals Data to the display panel 200. The image data signals Data are applied to the respective pixels P.

The driving circuit portion 400 may modify a grey level of the image data signal that is applied to any one pixel which causes a 3D C/T. For example, the image data signal Data corresponding to the pixel causing the 3D C/T reduces the grey level, and the grey level-reduced image data signal Data is output to the pixel causing the 3D C/T.

Through this, the 3D C/T can be reduced, which is explained in more detail below.

Figure 9:
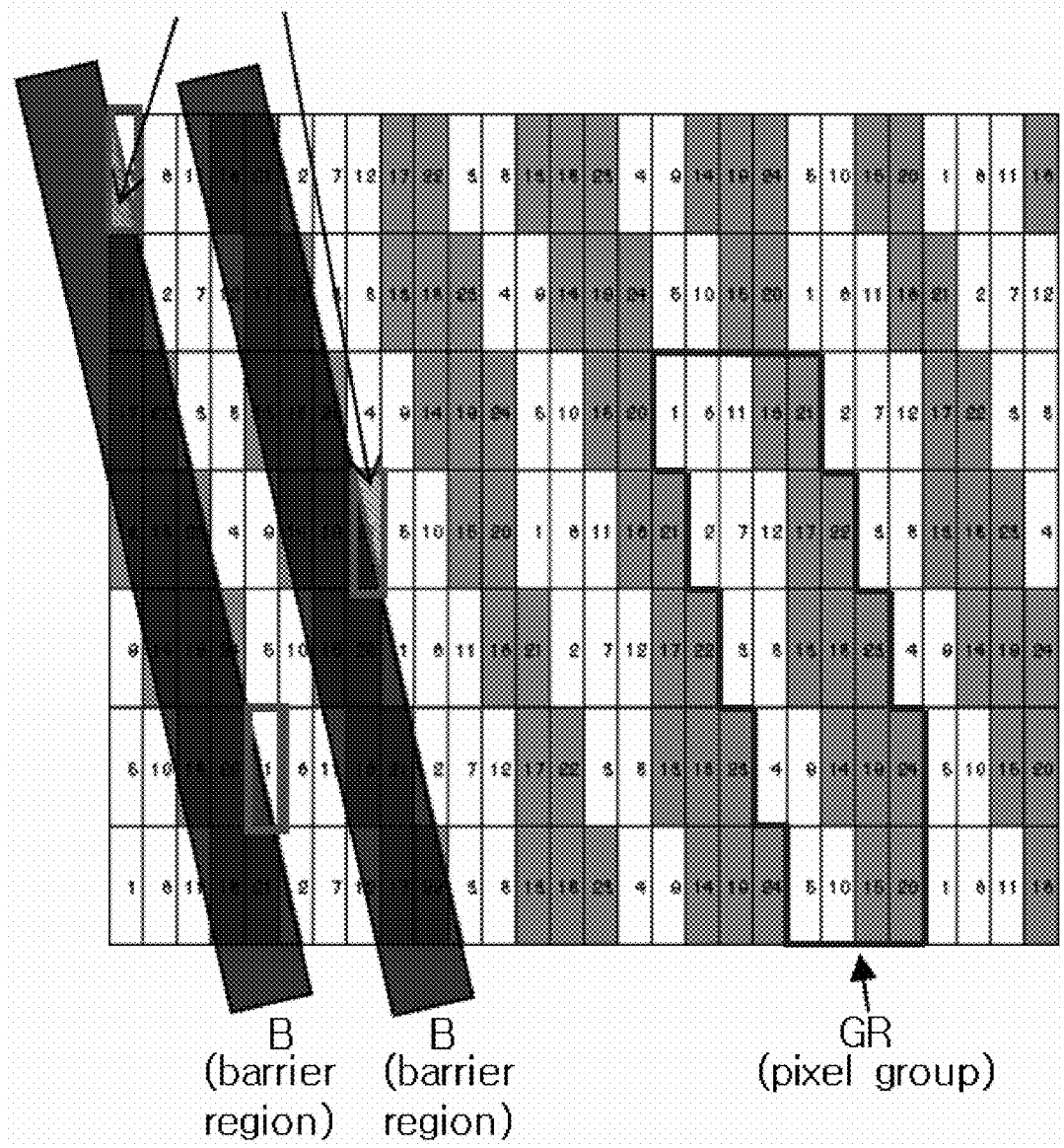
FIG. 9 is a view illustrating an arrangement of pixel of a display panel and an arrangement of a barrier region in a multi-view mode according to the first exemplary embodiment of the present invention.
Figure 10:
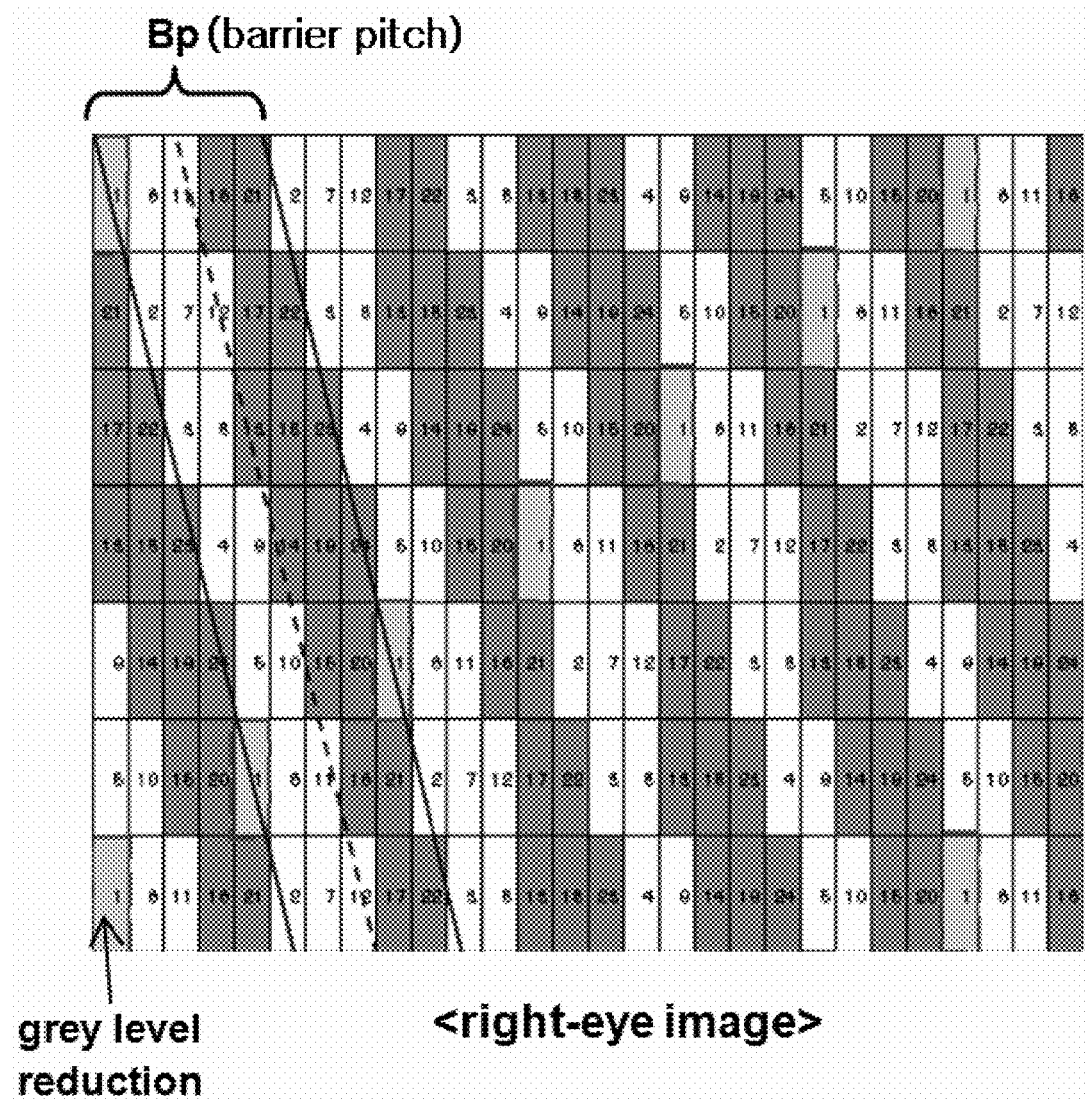
FIGS. 10 and 11 are views illustrating pixels displaying a right-eye image and pixels displaying a left-eye image, respectively, in a multi-view mode according to the first exemplary embodiment of the present invention.
Figure 11:
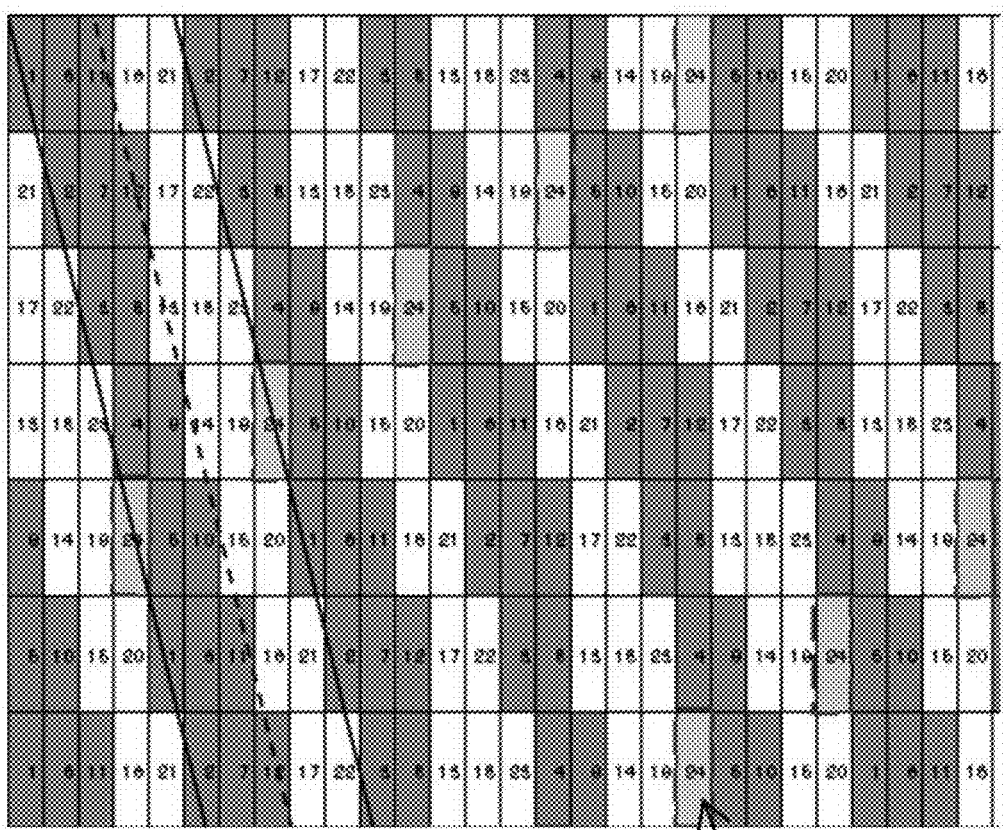

FIG. 9 is a view illustrating an arrangement of pixels of a display panel and an arrangement of barrier regions B in a multi-view mode according to an exemplary embodiment of the present invention. FIGS. 10 and 11 are views illustrating pixels displaying a right-eye image and pixels displaying a left-eye image, respectively, in a multi-view mode according to an embodiment of the present invention.

For the purpose of explanation, in FIGS. 9 to 11, a pixel arrangement is shown to implement 24 views. Pixels corresponding to the 24 views are indicated with corresponding numerals. Further, right-eye pixels displaying a right-eye image in FIGS. 9 and 10 are indicated in white, and left-eye pixels displaying a left-eye image in FIG. 11 are indicated in white.

Referring to FIGS. 9 to 11, in displaying a 3D image with 24 views, first to twenty-fourth pixels to create 24 views constitute a pixel group GR.

Images displayed by the first to twenty-fourth pixels are projected to 24 view points produced at a viewing distance at the front of the display device 100.

Each pixel group GR is configured to extend substantially along the slanted direction of the barrier region B. The pixel groups GR are arranged repeatedly along the slanted direction.

The barrier regions B and the transmissive regions T are arranged corresponding to the pixel group GR. In other words, a barrier pitch Bp (i.e., a distance from one side of a barrier region B to a corresponding side of a neighboring barrier region B) corresponds to the pixel group GR.

In the arrangement of the barrier regions B and the transmissive regions T, among pixels of each pixel group GR, pixels located on the left side with respect to a center line of the barrier pitch Bp are right-eye pixels, and pixels located on the right side with respect to a center line of the barrier pitch Bp are left-eye pixels.

At the viewing distance, left-eye view points and right-eye view points corresponding to each barrier pitch Bp are arranged at both sides. In other words, the left-eye view points corresponding to each barrier pitch Bp are located at one of the both sides, and the right-eye view points corresponding to each barrier pitch Bp are located at the other side of the both sides.

Accordingly, some pixels at a boundary of each barrier pitch Bp (i.e., pixels located at both side boundaries with respect to the slanted direction in each pixel group GR that are pixels located at a boundary of each barrier pitch Bp) may cause a 3D C/T.

In this regard, because the barrier regions B extends along the slanted direction across the vertical direction of the pixel, pixels at both side boundaries of each pixel group GR are partially located outside the boundary of each barrier pitch Bp.

In other words, a portion of each pixel at the boundary of the barrier pitch Bp is located inside the boundary of each barrier pitch Bp and another portion is located outside the boundary of each barrier pitch Bp.

This is explained with the first pixel of the right-eye pixel and the twenty-fourth pixel of the left-eye pixel.

Regarding the first pixel, a portion inside the corresponding barrier pitch Bp is viewed at a right-eye view point corresponding to the barrier pitch Bp. However, the other portion (the hatched portion of FIG. 9) outside the corresponding barrier pitch Bp is viewed at a left-eye view point corresponding to a neighboring barrier pitch Bp.

Regarding the twenty-fourth pixel, a portion inside the corresponding barrier pitch Bp is viewed at a left-eye view point corresponding to the barrier pitch Bp. However, the other portion (the hatched portion of FIG. 9) outside the corresponding barrier pitch Bp is viewed at a right-eye view point corresponding to a neighboring barrier pitch Bp.

As described above, the other portion of the pixel outside the boundary of the barrier pitch Bp is viewed at the view point opposite to the right-eye or left-eye view point corresponding to the pixel belonging to the other portion.

Accordingly, the partially covered pixels at the boundary of the barrier B cause the 3D C/T. Particularly, as an aperture ratio of the barrier panel become greater, the 3D C/T also becomes greater.

To solve this problem, in the embodiment, the pixels causing the 3D C/T display a grey level lower than the grey level corresponding to the intended displayed image.

In other words, the driving circuit portion 400 modifies an image data signal Data of a $n^{th}$ grey level of the intended image into an image data signal Data of a $m^{th}$ grey level less than the $n^{th}$ grey level, and supplies the modified image data signal Data of the $m^{th}$ grey level to the corresponding pixel.

Accordingly, this pixel has less affect at an eye opposite to an eye corresponding to the pixel image, and thus, the 3D C/T can be reduced.

When all pixels located at the boundary are reduced in grey level, reduction of the 3D C/T can be maximized, but image luminance is reduced.

Accordingly, the grey level modification may be applied to a pixel having a ratio, of an area outside the boundary to a total area of the pixel, greater than or equal to a reference area ratio. For example, the reference area ratio may be about 40% or more, and preferably, may be about 40% to about 60%.

Alternatively, the grey level modification may be applied to a pixel having the most area outside the boundary among pixels at the boundary.

In the grey level modification, the grey level may be reduced by about 40% to about 60%.

The above embodiment can also be applied to a display device using a lenticular lens.

Figure 12:
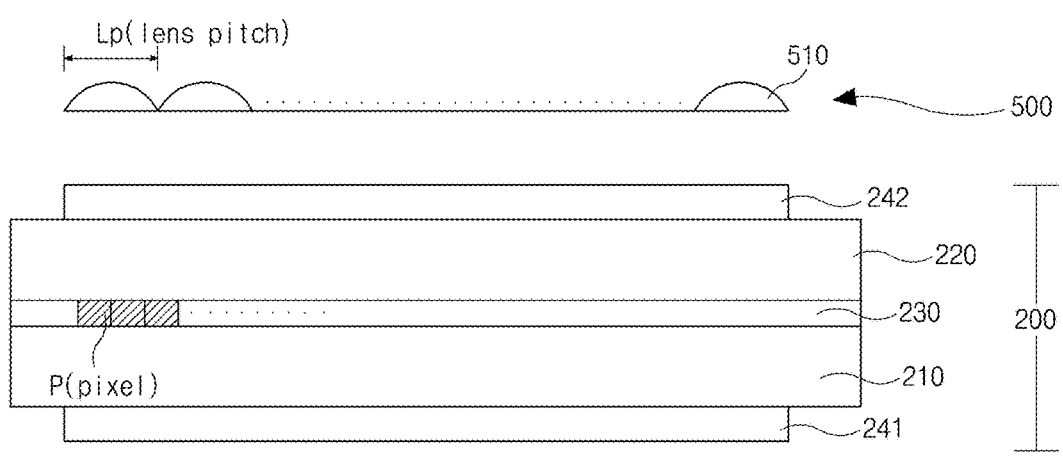
FIG. 12 is a schematic cross-sectional view illustrating a display device according to a second exemplary embodiment of the present invention.

FIG. 12 is a schematic cross-sectional view illustrating a display device according to a second exemplary embodiment of the present invention. Explanations of features similar to those of the first embodiment may be omitted.

Referring to FIG. 12, the display device uses a lenticular lens panel 500 to produce multi-views.

The lenticular lens panel 500 refracts incident light through a lens array 510 and guides the light to the respective view points.

The lenticular lens panel 500 may be a panel using lenticular lenses in an array. Alternatively, the lenticular lens panel 500 may be a panel using a liquid crystal to refract light.

The lens array 510 extends in a slanted direction and produces multi-views.

A lens pitch Lp (i.e., a width of lens) corresponds to the pixel group (GR of FIG. 9) similar to the first embodiment.

Pixels located at a boundary of the lens pitch Lp cause a 3D C/T. Accordingly, in a similar way to the first embodiment, a grey level reduction is performed for pixels at the boundary, and thus, the 3D C/T can be reduced.

As described above, in the display device using a multi-view producing panel such as the slanted type parallax barrier or lenticular lens, at least one among pixels at both side boundary of the pixel group is reduced in grey level. Accordingly, the pixel has less effect on an image in an eye opposite to an eye corresponding to the pixel, and thus, a 3D C/T can be reduced.

It will be apparent to those skilled in the art that various modifications and variations can be made in the display device and a method of displaying an image of embodiments of the invention without departing from the spirit or scope of the invention. Thus, it is intended that embodiments of the invention cover the modifications and variations of this invention provided they come within the scope of the appended claims and their equivalents.

What is claimed is:

1. A display device producing multi-views comprising:
a display panel including a plurality of pixels in a matrix, wherein the plurality of pixels corresponding to the multi-views, respectively, constitute a pixel group in a slanted direction with respect to a vertical direction, and wherein the multi-views are at least three views;
a multi-view point producing panel including a barrier region or a lenticular lens array in the slanted direction having a barrier pitch corresponding to the pixel group; and
a driving circuit configured to reduce a grey level of an image data signal of at least one pixel of the plurality of pixels, which is at a side boundary of the pixel group causing a three-dimensional (3D) crosstalk (C/T) and has a ratio of an area outside a boundary of the barrier pitch to a total area of the at least one pixel that is greater than or equal to 40%, and output an image data signal having a reduced grey level to the display panel.

2. The device according to claim 1, wherein the grey level of the image data signal is reduced by 40% to 60%.

3. The device according to claim 1, wherein the display panel is one of a liquid crystal panel, an organic light-emitting diode panel, and a plasma display panel.

4. The device according to claim 1, wherein the multi-view point producing panel is a liquid crystal panel.

5. The device according to claim 1, further comprising a gap substrate between the multi-view point producing panel and the display panel to maintain a distance between the multi-view point producing panel and the display panel.

6. The device according to claim 1, wherein each pixel has a rectangular shape that has two sides along a vertical direction and other two sides along a horizontal direction.

7. A method of driving a display device, wherein the device display device includes a display panel including a plurality of pixels in a matrix, wherein pixels corresponding to multi-views, respectively, constitute a pixel group in a slanted direction with respect to a vertical direction, and a multi-view point producing panel including a barrier region or a lenticular lens array in the slanted direction having a barrier pitch corresponding to the pixel group, the multi-views being at least three views, the method comprising:
reducing a grey level of an image data signal corresponding to at least one pixel of the plurality of pixels, which is at a side boundary of the pixel group causing a 3D C/T and has a ratio of an area outside a boundary of the barrier pitch to a total area of the at least one pixel that is greater than or equal to 40%, by a driving circuit; and
outputting an image data signal having a reduced grey level from the driving circuit to the display panel.

8. The method according to claim 7, wherein the grey level of the image data signal is reduced by 40% to 60%.

9. The method according to claim 7, wherein the display panel is one of a liquid crystal panel, an organic light-emitting diode panel, and a plasma display panel.

10. A display device comprising:
a display panel including a plurality of pixels, wherein the plurality of pixels include a slanted pixel group configured in a slanted direction with respect to a vertical direction;
a multi-view point generating panel including a barrier region or lenticular lens array configured in the slanted direction having a barrier pitch corresponding to the slanted pixel group; and
a driving circuit configured to reduce a grey level of an image data signal of at least one pixel at a side boundary of the slanted pixel group which could cause crosstalk with respect to displaying three-dimensional images and has a ratio of an area outside a boundary of the barrier pitch to a total area of the at least one pixel that is greater than or equal to 40%.

11. The device according to claim 10, wherein the grey level of the image data signal is reduced by 40% to 60% compared to the image data signal without grey level reduction.

12. The device according to claim 10, wherein the display panel is one of a liquid crystal panel, an organic light-emitting diode panel, and a plasma display panel.

13. The device of claim 10, wherein the slanted pixel group is configured in a repetitive manner for a pixel arrangement across the entire display panel.

14. The device of claim 13, wherein the display panel, the multi-view point generating panel, and the driving circuit are configured to support non-glasses type viewing experiences.

15. The device of claim 14, wherein the display panel, the multi-view point generating panel, and the driving circuit are implemented with respect to automotive applications.

16. The device of claim 15, wherein the display panel, the multi-view point generating panel, and the driving circuit are implemented to allow side-by-side seated occupants in a vehicle to respectively see different image contents.

17. The device of claim 16, wherein the display panel, the multi-view point generating panel, and the driving circuit are implemented with respect to organic light emitting diode (OLED) technology.

18. The device of claim 16, wherein the display panel, the multi-view point generating panel, and the driving circuit are implemented with respect to liquid crystal display (LCD) technology.

* * * * *